Aug. 23, 1938.  E. W. MITCHEL  2,127,696
NUT AND METHOD OF MAKING SAME
Filed Oct. 6, 1937
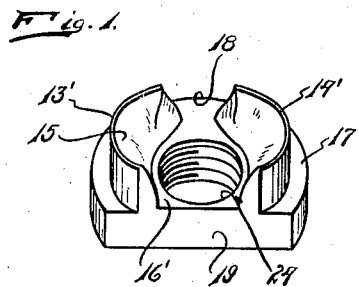
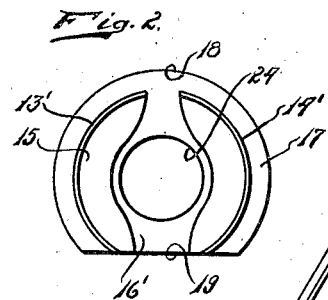
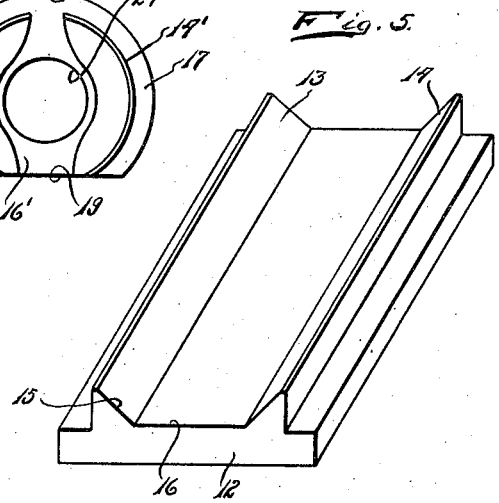
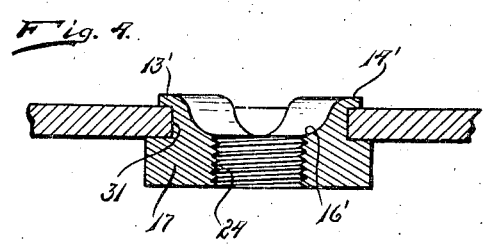
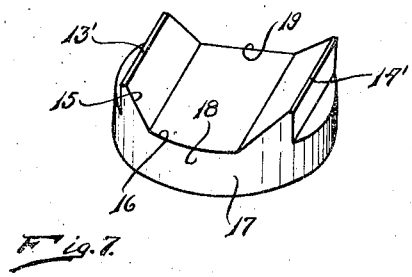
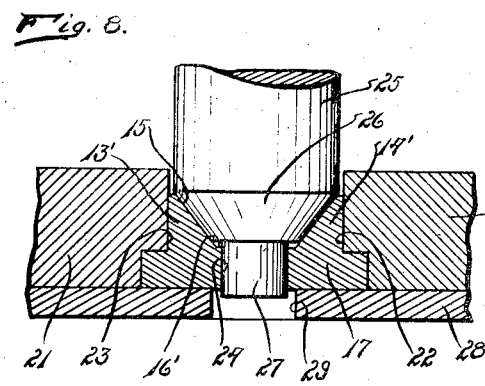
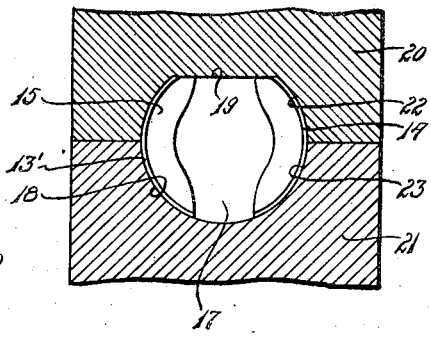
INVENTOR.
EDWARD W. MITCHEL
BY Thos. L. Donnelly
ATTORNEY.

Patented Aug. 23, 1938

2,127,696

UNITED STATES PATENT OFFICE 2,127,696

NUT AND METHOD OF MAKING SAME

Edward W. Mitchel, Detroit, Mich.

Application October 6, 1937, Serial No. 167,491

5 Claims. (Cl. 10—86)

My invention relates to a new and useful improvement in a nut and the method of forming the same and has for its object, the provision of a nut having means projecting outwardly from one face thereof which may be upset or clinched over an opening bearing body through which the projecting means may be extended. It has been found that a need exists for some means for retaining a nut in position relatively to an opening formed in a body so that a bolt or screw may be threaded into the nut. Particularly is this important where the rear of the opening bearing body is not accessible and at which side it is desired that the nut be located. Various means have been provided for securing the nut in position on the opening bearing body and among these means there has been produced a nut, projecting outwardly from one face of which is a projection capable of being extended through the opening and upset over the opening bearing body to retain the nut in position. The difficulty with such a device and with other similar devices is the expense involved in manufacture and the necessity of resorting to machining and other expensive operations in their production.

It is an object of the present invention to provide a nut having the necessary projections for clinching or upsetting and so constructed and arranged that it can be economically manufactured while at the same time it will be durable, highly efficient in use and capable of easy application.

Another object of the invention is the provision of a nut so constructed and arranged as to have a pair of arcuate oppositely disposed securing members projecting outwardly from one face and adapted for being clinched over an opening bearing body.

Another object of the invention is the provision of a method of forming a nut consisting in forming on an elongated body, a pair of oppositely disposed parallel ribs, cutting the body to the proper size for forming a nut and then forming the ribs into arcuate form at opposite sides of an opening formed in the body.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of a nut in its completed form.

Fig. 2 is a top plan view of a nut in its completed form.

Fig. 3 is a perspective view of an opening bearing body showing the nut in attached position thereon.

Fig. 4 is a sectional view taken on line 4—4 of Fig. 3.

Fig. 5 is a perspective view of a blank from which the nut is formed.

Fig. 6 is a perspective view of a nut blank as cut from the blank.

Fig. 7 is a sectional view illustrating the formation of the parallel ribs into arcuate attaching members.

Fig. 8 is a central sectional view through one of the nuts at one stage of the forming operation.

I have discovered that an elongated strip of metal may be rolled or formed into an elongated planal body 12 having the parallel extending, oppositely disposed ribs 13 and 14 formed at opposite sides of the body, these ribs being formed preferably triangular shaped in cross-section with the inner wall 15 inclined to the face 16 of the body outwardly from which these ribs project. The major portion of the perimeter of the nut body 17 is formed circular as at 18 with the flat face 19 extending chordally of the circle on which the major portion of the perimeter is struck. The rib sections 14' and 13' carried by the nut body 17, serve as attaching projections extending outwardly from the face 16'.

A pair of die sections 20 and 21, having the cavities 22 and 23 formed therein, are used to further form the nut.

The nut blank, in the form shown in Fig. 6, is placed in one of the cavities and the die sections are then brought together as shown in Fig. 7 thus effecting a squeezing or pressing of the ribs 13' and 14' into bow or arcuate shape. If desired, the central opening 24 in the nut may then be formed by a punching process. This operation is illustrated in Fig. 8. In this figure the punch 25 is illustrated as provided with the tapered shank 26 terminating in the reduced extension 27 which is of the desired size for punching the opening 24. In such an operation, the die sections 20 and 21 would rest upon a bed 28 having an opening 29 formed therein. As the tapered shank 26 enters the space between the arcuate attaching ribs 13' and 14' the shank 26 would serve to press these ribs into original shape in the event that they were distorted and pressed inwardly in the operation illustrated in Fig. 7. It is believed obvious that the hole in the nut might be punched at the same time the nut body 17 is punched from the strip 12. This hole is, of course, threaded for the reception of a screw or bolt and in its completed form the nut is as illustrated in Fig. 1.

In use, the nut is used with a body 30 in which an opening 31 is formed, this opening conforming in shape to the general contour of the nut body 17 but of slightly smaller dimensions so that the ribs 13' and 14' will project through the opening 31, with the body 17 of the nut overlying the opening. These ribs may then be clinched or upset over the body 30 as illustrated in Fig. 3 and Fig. 4.

It will be noted that the arcuate ribs 13' and 14' are separate from each other. By having these ribs separate an easier operation will effect the clinching or upsetting of the ribs than would be required were the ribs to be joined and from one continuous body. Furthermore, the formation of the ribs as separate and distinct from each other results in an economy of material and renders it possible to form the nut with a minimum amount of labor operations and without any machining except that required for the threading of the opening in the nut. It, therefore, becomes possible to produce the nut almost in its entirety by a stamping operation and experience has shown that such a procedure results in considerable economy in the manufacture of such a nut. This, of course, is due largely to the turning inwardly of the oppositely disposed corresponding ends of the planal ribs to form bow shaped or arcuate bodies, with the concavities of such a formation faced inwardly toward each other.

While I have illustrated and described the preferred form of construction, I do not wish to limit myself to the precise details of structure shown, but desire to avail myself of such variations and modifications as may come within the scope of the appended claims.

What I claim as new is:

1. A method of forming a nut consisting in forming an elongated planal body with a pair of ribs projecting outwardly from one face thereof and extending parallel to each other at opposite sides of the medial line of said body, severing therefrom, sufficient material to constitute a nut body with the ribs extending across said body in parallel relation to each other, forming an opening in said nut body between said ribs and threading the same and pressing said ribs into arcuate form with the concavity of said ribs facing each other.

2. A nut comprising a metallic body having a threaded opening formed therethrough; and oppositely disposed bow-shaped ribs integral with said body and projecting outwardly from one face thereof within the marginal limits thereof and faced inwardly toward said opening and pressed into arcuate formation out of parallel relation, the grain of the metal of said ribs extending longitudinally thereof.

3. A nut blank comprising a planal body of general circular formation and being less than a circle, the perimeter, at one side of said body, being planal; a pair of ribs each positioned at opposite sides of said body and extending across the same and terminating at one of their ends flush with the planal side of said body.

4. The method of forming a nut from a nut blank having a pair of oppositely disposed parallel extending ribs projecting outwardly from one face thereof and extending across the same consisting in forming and threading a hole in said blank between said ribs and subjecting said ribs to sufficient pressure for transforming the same into arcuate formation with the arcs thereof faced inwardly toward the opening.

5. The method of forming a nut from a nut blank having a pair of oppositely disposed parallel extending ribs projecting outwardly from one face thereof and extending across the same consisting in forming and threading a hole in said blank between said ribs and subjecting said ribs at opposite sides of their transverse medial lines to inward pressure sufficiently for transforming the same into bow shaped formations, at opposite sides of said opening and faced toward each other.

EDWARD W. MITCHEL.